(12) United States Patent
Kildea

(10) Patent No.: US 6,897,401 B2
(45) Date of Patent: May 24, 2005

(54) NON-SEPARATING DIFFUSER FOR HOLES PRODUCED BY A TWO STEP PROCESS

(75) Inventor: Robert J. Kildea, North Palm Beach, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/632,260

(22) Filed: Jul. 31, 2003

(65) Prior Publication Data

US 2005/0023249 A1    Feb. 3, 2005

(51) Int. Cl.⁷ .............................. B23H 9/10; B23H 7/22
(52) U.S. Cl. ................... 219/69.17; 219/69.15
(58) Field of Search ................ 219/69.15, 69.17; 29/889.721; 205/665

(56) References Cited

U.S. PATENT DOCUMENTS

| | | | | |
|---|---|---|---|---|
| 4,650,949 A | * | 3/1987 | Field | 219/69.15 |
| 4,762,464 A | * | 8/1988 | Vertz et al. | 416/97 R |
| 4,808,785 A | * | 2/1989 | Vertz et al. | 219/69.17 |
| 4,850,147 A | * | 7/1989 | Baker | 451/58 |
| 4,922,076 A | * | 5/1990 | Cross et al. | 219/69.15 |
| 6,759,621 B2 | * | 7/2004 | Varin | 219/69.15 |

* cited by examiner

*Primary Examiner*—Geoffrey S. Evans
(74) *Attorney, Agent, or Firm*—Bachman & LaPointe, P.C.

(57) ABSTRACT

A method for forming non-separating diffusers in a part includes fabricating at least one metering hole in a part, and fabricating at least one diffuser hole with an electrode comb in the part such that the diffuser hole intersects the metering hole at a transition region. The electrode comb includes a tooth including a nose comprised of a plurality of diffuser surfaces intersecting at a point on a tooth centerline. Each diffuser surface has a diffuser angle, and at least one of the diffuser surfaces is truncated by an offset from the tooth centerline.

15 Claims, 4 Drawing Sheets

NON-SEPARATING DIFFUSER FOR HOLES PRODUCED BY A TWO STEP PROCESS

U.S. GOVERNMENT RIGHTS

The invention was made with U.S. Government support under contract F33657-90-C-2212 awarded by the Department of the Air Force, and under contract N00019-97-C-0050 awarded by the Department of the Navy. The U.S. Government has certain rights in the invention.

BACKGROUND OF THE INVENTION (1) Field of the Invention

The present invention relates to method to fabricate non-separating diffuser holes formed by way of a two step process and an electrode comb used in the method.

(2) Description of Related Art

Cooling hole efficiency is of great consequence for High Pressure Turbine Blades in high performance aircraft gas turbine engines. To be achieve maximum efficiency, each hole ideally exhibits a small meter section to limit cooling air flow and a diffuser to slow down the air flow and spread it over the surface of the airfoil in a thin film.

One common hole used to provide such cooling characteristics is the "Vehr" hole (disclosed in U.S. Pat. No. 4,653,983) which permits the cooling air flow to be discharged at an angle to the main gas path flow. This "cross flow" helps to create a more uniform layer of film cooling to insulate the blade from the high temperature gas path air. The Vehr hole uses two diffusion surfaces for holes on the pressure and suction surfaces, and three diffusers for holes along the tip and platform of the blade.

A critical requirement of such a hole is that there be no step between the meter section and the diffuser surfaces. This is not a problem when both features are produced from a single electrode, but is a major problem if the hole is produced by one process and the diffuser is produced by a different process and/or operation.

There are several reasons to want to use one process to produce the metering hole and another process or operation to produce the diffuser, specifically, cost and difficulty of fabrication. For example, it is more efficacious, and hence cheaper, to use a more efficient LASER process to produce the hole, while using an EDM process to machine the diffuser. With regards to difficulty, drilling a "Vehr type hole" into a small cavity in modern "super-cooled airfoils" is very difficult with a single shaped electrode and is very costly if not impossible without back-striking the inner wall which causes a stress concentration factor in the already highly stressed inner wall. This problem is greatly reduced if the hole is produced in a two step process.

Regardless of the processes used, a two step hole process using a combination of LASER, electro discharge machining (EDM) or Electron beam drilling will create a step between the hole and the diffuser surfaces which will degrade the cooling ability of the "Vehr" holes produced. The step is caused by the location tolerance of the diffuser relative to the centerline of the hole.

What is therefore needed is a modified "Vehr" type diffuser, and a method for producing it, which can accommodate a certain amount of location tolerance of the diffuser relative to the hole without causing "separation" of the flow from the diffuser surface.

SUMMARY OF THE INVENTION

Accordingly, it is an object of the present invention to provide a method, and apparatus for so performing, to fabricate non-separating diffuser holes formed by way of a two step process.

It is a further object of the present invention to provide a method for forming non-separating diffusers in a part which comprises the steps of fabricating at least one metering hole in a part, providing at least one electrode comb comprising a tooth said tooth comprising a nose comprised of a plurality of diffuser surfaces intersecting at a point on a tooth centerline, and at least one of said plurality of diffuser surfaces truncated by an offset from the centerline, and fabricating at least one diffuser hole with the electrode comb in the part so that the at least one diffuser hole intersects the at least one metering hole at a transition region.

It is a further object of the present invention to provide an electrode comb for providing diffusing holes which comprises at least one nose extending to a point along a centerline, the nose comprising an additional angle portion capable of forming a transition region.

It is a further object of the present invention to provide a method for forming non-separating diffusers in a part which comprises the steps of fabricating at least one metering hole in a part, and fabricating at least one diffuser by a different process or operation. The diffuser has an array of angled surfaces passing through a common nose point along the tooth centerline to provide a transition region from the through hole, to the diffuser portion of the hole. Where diffusion is desired, these surfaces continue beyond the part surface (under worst tolerance conditions). On surfaces where diffusion is not desired, these surfaces are truncated at a distance from the nominal centerline of the tooth so as to merely eliminate the step which would exist between the edge of the hole and the edge of the diffuser hole due to tolerances between the two operations.

DETAILED DESCRIPTION OF THE PREFERRED EMBODIMENT(S)

The present invention teaches the creation of a preferably EDM'd diffuser whose centerline is nominally co-linear with the hole drilled through the wall which forms the meter section of the finished "Vehr" hole. The hole may be round or rectangular with filleted corners.

The present invention is herein described in terms of the EDM tool used to form the diffuser. While described as though the hole is drilled first, the process may in practice be reversed. The present invention is described herein with respect to a "comb electrode" having at least two teeth. However, it would be obvious to one skilled in the art to extend the teachings of the present invention to include the use of a single tooth electrode used to EDM one diffuser at a time, or, if "n" parallel holes exist in a plane, a comb of "n" teeth could be used to form the diffuser on "n" holes at a time. Therefore, as used herein, "comb electrode" refers as well to an electrode having only one tooth. In the case of a single tooth electrode, the tolerance to be accommodated between the centerline of the hole and the centerline of the diffuser is minimal. In the case of a comb to drill "n" diffusers at the same time, the tolerance to be accommodated is greater.

The diffuser electrode of the present invention is similar to the diffuser portion of an electrode known in the art which produces both the hole and the diffuser in a single EDM process. These known electrodes usually have four sides in current practice, whether the electrodes are manufactured by wire EDM from strip copper or coined in multi-stage dies. The one or two sides which have no diffuser have a single surface on the portion forming the meter hole and the straight (no diffusion) side of the diffuser.

The description of the diffuser of the present invention is based on a four sided electrode, but the process may be extended to cases wherein the number of diffusers is based on three or even five or more diffusers in an array about the hole centerline.

Figure 1:
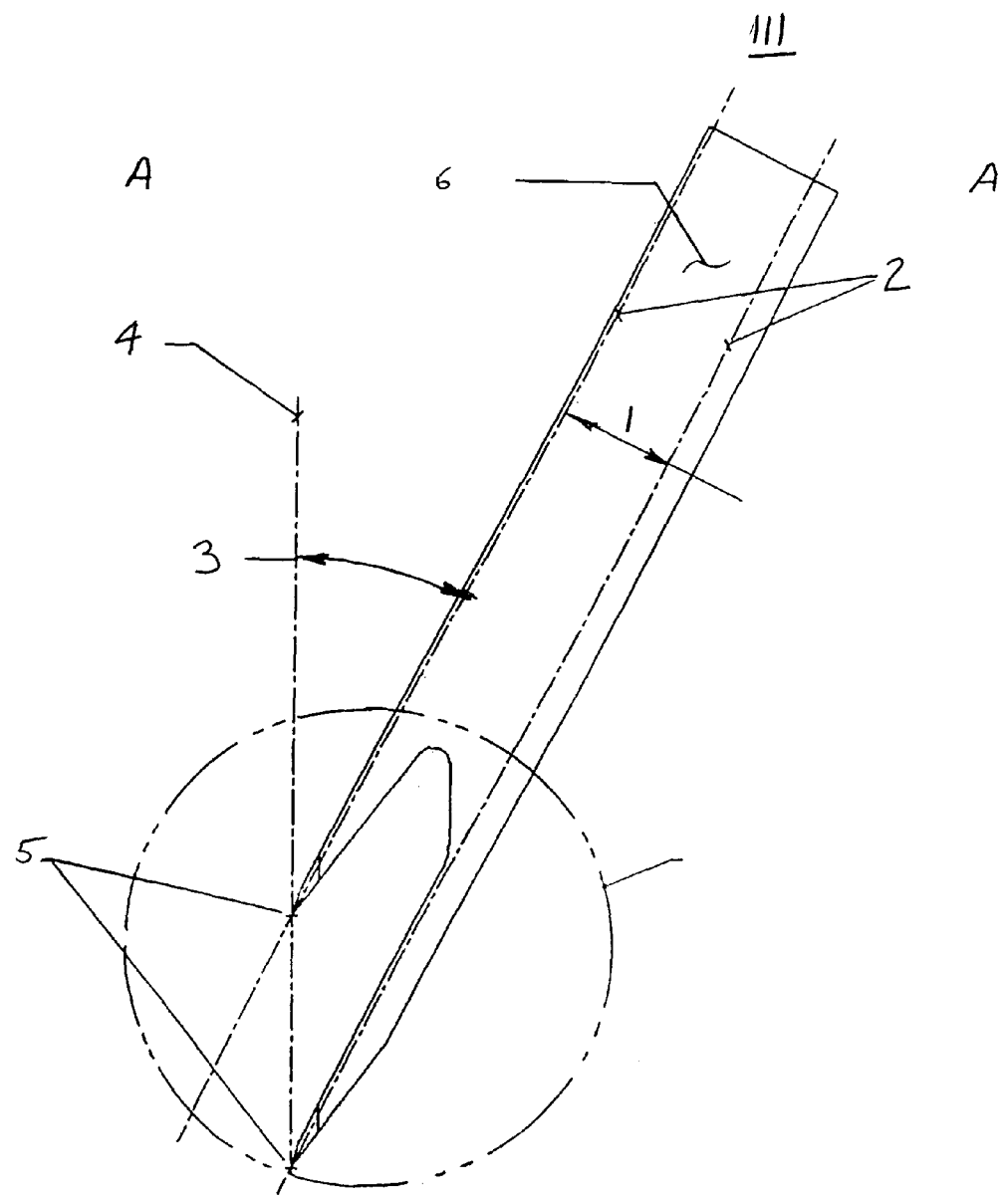
FIG. 1 is a diagram of an electrode comb of the present invention.

With reference to FIG. 1, there is illustrated a two tooth electrode comb 111 to produce two diffusers at the same time on two parallel holes which are spaced one pitch 1 apart. The nominal pitch 1 between the centerlines 2 of the teeth is the same as the nominal distance between two adjacent parallel holes in the same plane. The meter angle 3 is the angle which each hole makes with the meter line 4.

In the case of a one-step hole, the meter line 4 is a line drawn through the point at which the diffusers meet the meter hole. In this disclosure, the meter line 4 for the two-step hole is drawn through the common intersection of the four diffuser planes with the hole centerline. Meter line 4 is a line parallel to the meter line of finished holes. Meter line 4 passes through the point or points 5 at which the four diffusers cross the tooth centerlines 2. The upper area 6 of the electrode comb 111 is the area used to mount the electrode in an EDM machine. Upper area 6 may have features used for mounting and aligning the electrode.

Figure 2:
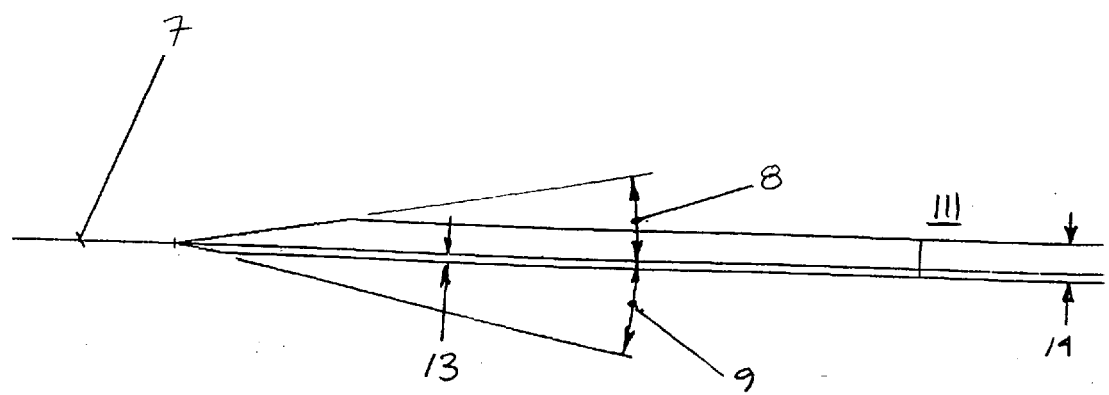
FIG. 2 is a view of an electrode looking down the meter line of the electrode.

With reference to FIG. 2, there is illustrated a view of electrode comb 111 looking down along the meter line 4 of the electrode comb 111. Plane 7 is the basic plane of the electrode comb 111 which is nominally coincident with a plane through the centerline of the nominal holes. The aft diffuser angle 8 and the forward diffuser angle 9 are defined in this view for a comb electrode. The thickness 14 of the electrode comb 111 is illustrated. Preferably, diffuser angles 8, 9 are no greater than 12°. Most preferably, diffuser angles 8, 9 are approximately 10°.

Figure 3:
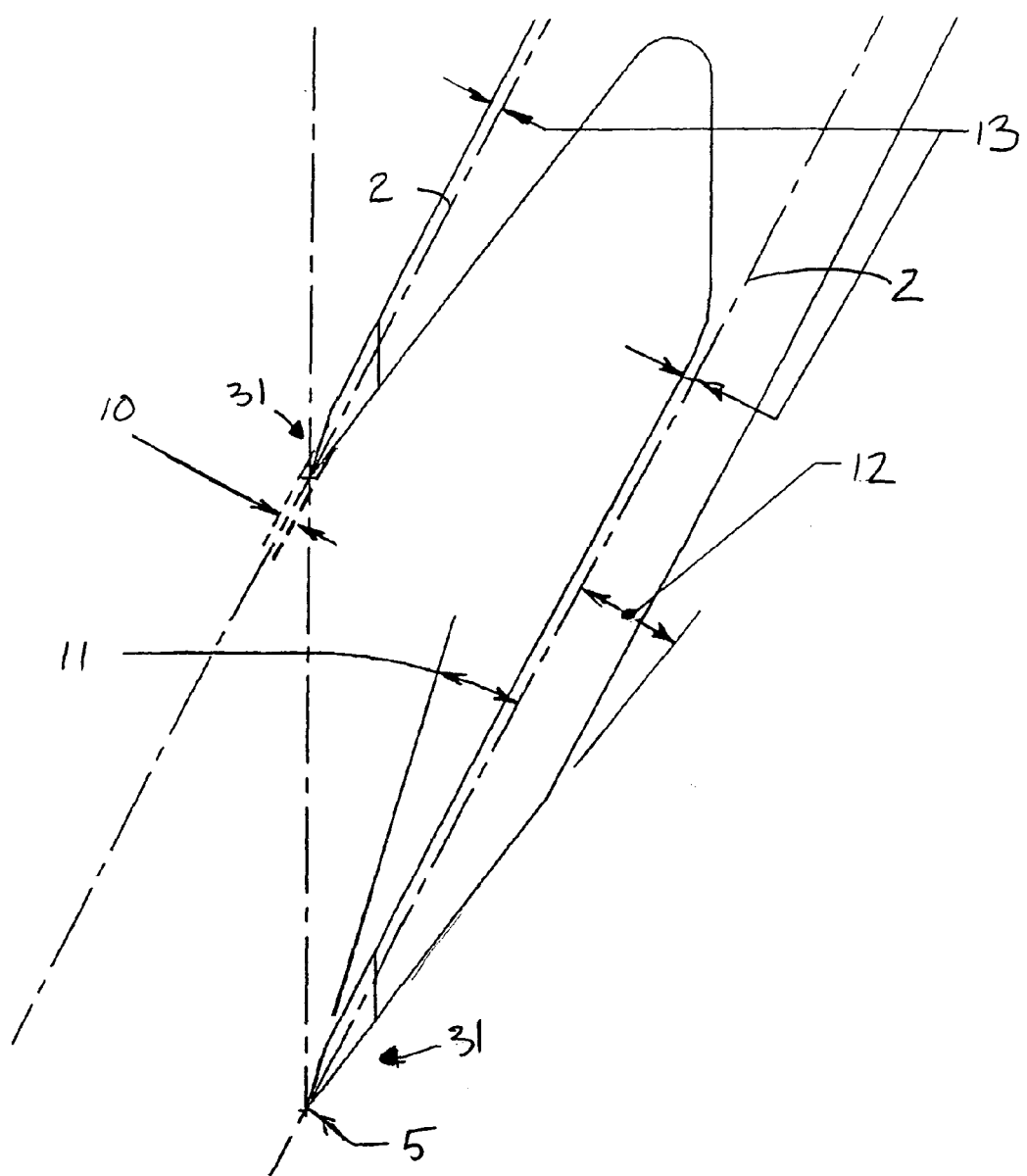
FIG. 3 is a detail of the nose section of an electrode comb of the present invention.

With reference to FIG. 3, there is illustrated an enlarged view of the diffuser area of the electrode comb 111. The cooling hole diameter 10 in the airfoil is shown (dashed on the upper hole) in its nominal location (generally aligned with the centerlines 2 of the comb teeth or nose 31). The upper diffuser angle 11 and the lower diffuser angle 12 are shown in this figure. Preferably, diffuser angles 11, 12 are no greater than 12°. Most preferably, diffuser angles 11, 12 are approximately 10°.

In the present example, the nose 31 of the electrode 111 has four diffusers created by angles 8, 9, 11 and 12, which terminate in a point 5 on the centerline 2 of the tooth. (Note that the centerline of the tooth is nominally co-linear with the centerline of the hole). The diffusers make an angle with the centerline of the tooth which will permit the flow to follow the break in the surface without causing the flow to separate from the diffuser wall. Preferably, the maximum diffusion angle for any of the angles 8, 9, 11, 12 is usually about 10 degrees to avoid flow separation.

In the case of a two diffuser "Vehr" hole, the diffusers formed by angles 9 & 11 on the radially outboard side of the hole and that on the forward side of the hole are terminated by a surface offset 13 from the centerline of the hole by a distance equal to one half the width of the Max. hole plus the Max. tolerance (in the applicable direction) which can be maintained between the centerline of the hole and the centerline of the diffuser. This tolerance is greater for a multi tooth electrode since the variation of the pitch between adjacent centerlines of both the holes and the comb must be taken into account, as well as the rotation of the comb relative to a plane containing the centerlines of the holes.

It can be seen that the portion of the hole adjacent to the hole meter section will have diffusion on all four sides over some distance. The area ratio for this hole will therefore tend to be greater than the hole produced by the conventional single step EDM process. This is partially offset by the fact that the surface offset on the front diffuser will decrease the distance from the hole meter to the plane where the area ratio is measured.

These holes will also have a slightly greater coverage (vertical height of the hole breakout on the airfoil surface) than for a hole produced by the conventional single step EDM process.

Increased area ratio and coverage are advantageous to providing a more efficient hole for film cooling of airfoils.

Other optional methods for producing a two step hole include casting the diffusers in the airfoil wall, then drilling the hole by EDM, LASER drilling or Electron Beam drilling. In addition, one can machine the diffuser shape, then drill the hole by EDM, LASER drilling or Electron Beam drilling. These steps may be performed in the reverse order.

Figure 4:
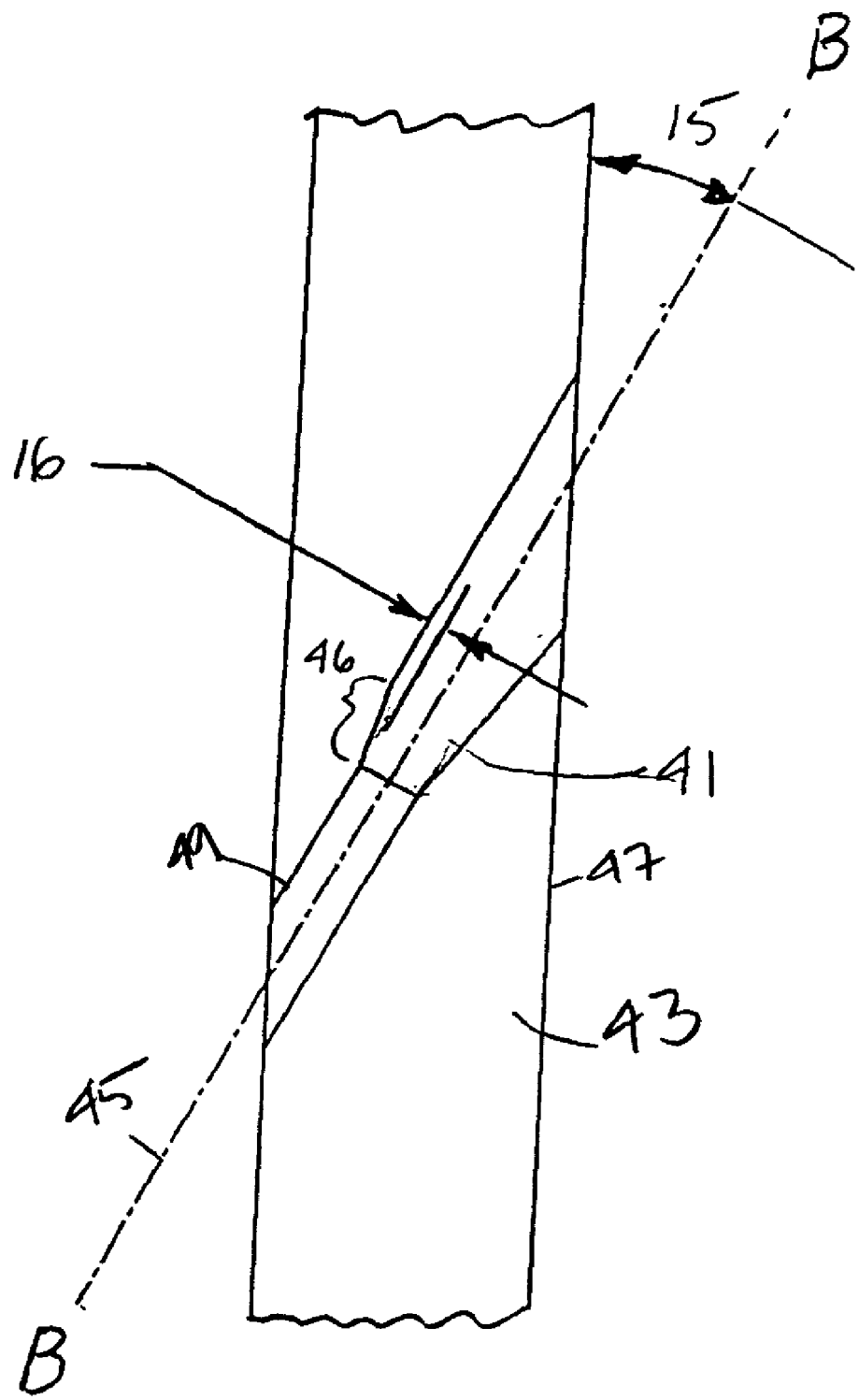
FIG. 4 is a diagram of a meter hole and diffuser as produced by the present invention.

With reference to FIG. 4, there is illustrated a cross-section of the finished diffuser 41 in a part 43. Since this is a single diffuser hole 41, the vertical angle 15 between the hole centerline 45 and the part surface 47 is roughly equivalent to the meter angle 3 of the electrode comb 111. It should be noted that the offset distance 16 between the upper hole edge and the upper diffuser in the part 43 is equal to the nominal offset 13 plus or minus the sum of the position tolerance of the diffuser 41 relative to the meter hole 49, and the tolerance of the hole radius 41.

If the offset distance 16 from the edge of the diffuser section of the hole (side parallel to the hole centerline) to the edge of the hole 49 can be controlled directly in the two step process, the offset 13 on the diffuser can be reduced to the nominal hole radius plus the location tolerance between the two features (meter hole and diffuser).

The present invention therefore teaches a method to produce a combination metering hole and diffusing hole in a turbine airfoil using a two step process so as to maintain a smooth transition between the two portions of the hole. Due to manufacturing tolerances the centerline of each hole may be offset. Offset results in a step where flow separates. To prevent this, a transition region 46 is added. To produce this region, an additional angled portion of approximately 10 degrees is added to the EDM comb used to produce the diffusing hole. On any side where the step could occur, the electrode comb is offset (thickened) by an amount equal to one-half the max meter hole diameter plus the max position tolerance. The leading edge of this extra material is formed into a point with an angle on that side of approximately 10 degrees. This creates a normal diffusing hole with a short transition (diffusing) region 46 between the metering hole and the diffusing hole. The diffusing angle is small enough in the transition region that flow separation does not occur.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for forming non-separating diffusers in a part comprising the steps of:
    fabricating at least one metering hole in a part;
    providing at least one electrode comb comprising a tooth, said tooth comprising a nose comprised of a plurality of diffuser surfaces intersecting at a point on a tooth centerline, said plurality of diffuser surfaces each possessing a diffuser angle, and at least one of said plurality of diffuser surfaces truncated by an offset from the centerline; and
    fabricating at least one diffuser hole with said electrode comb in said part so that said at least one diffuser hole intersects said at least one metering hole at a transition region.

2. The method of claim 1, wherein said fabricating said at least one metering hole comprises utilizing a method of fabrication selected from the group consisting of electro discharge machining (EDM), LASER drilling, and electron beam drilling.

3. The method of claim 1, wherein fabricating said at least one metering hole is performed prior to fabricating said at least one diffuser hole.

4. The method of claim 1, wherein providing said electrode comb comprises the step of providing an electrode comb wherein at least one of said plurality of diffuser surfaces is offset from the comb centerline by a distance sufficient to eliminate a step between a side of said metering hole and said diffuser hole.

5. The method of claim 4, wherein fabricating said at least one diffuser hole comprises the step of:
    inserting said electrode comb into said part such that said at least one diffuser hole intersects said at least one metering hole to form at least one transition region.

6. The method of claim 1, wherein fabricating one metering hole diffuser is performed prior to fabricating said at least one metering hole.

7. The method of claim 6, wherein fabricating said at least one metering hole comprises the step of:
    fabricating said at least one metering hole such that said at least one metering hole intersects with said at least one diffuser hole to form at least one transition region.

8. The method of claim 1, wherein said diffuser angle of each of said at least one diffuser surfaces comprises an angle not greater than 12°.

9. The method of claim 1, wherein said diffuser angle of each of said at least one diffuser surfaces comprises an angle of approximately 10°.

10. The method of claim 1, wherein fabricating at least one metering hole in a part comprises fabricating said at least one metering hole in a turbine component.

11. An electrode comb for providing diffusing holes comprising:
    at least one nose extending to a point along a centerline, said nose comprising a plurality of diffuser surfaces capable of forming a transition region.

12. The electrode of claim 11, wherein at least one of said plurality of diffuser surfaces is truncated by an offset from said centerline.

13. The electrode of claim 11, wherein said plurality of diffuser surfaces each possess a diffuser angle.

14. The electrode of claim 13, wherein said diffuser angle of at least one of said plurality of diffuser surfaces comprises an angle not greater than 120.

15. The electrode of claim 13, wherein said diffuser angle of at least one of said plurality of diffuser surfaces comprises an angle of approximately 10°.

* * * * *

UNITED STATES PATENT AND TRADEMARK OFFICE
CERTIFICATE OF CORRECTION

PATENT NO.     : 6,897,401 B2
DATED          : May 24, 2005
INVENTOR(S)    : Robert J. Kildea It is certified that error appears in the above-identified patent and that said Letters Patent is hereby corrected as shown below:

Column 6,
Line 36, "120" should read -- 12° --.

Signed and Sealed this

Thirtieth Day of August, 2005

JON W. DUDAS
*Director of the United States Patent and Trademark Office*